United States Patent Office 3,423,865
Patented Jan. 28, 1969

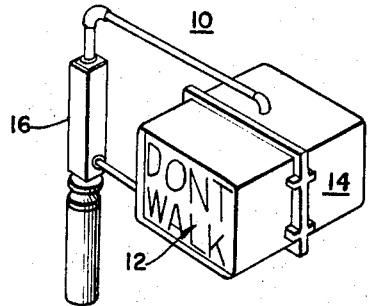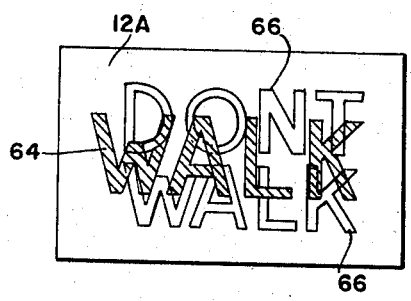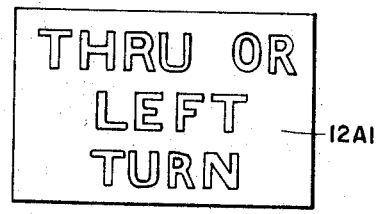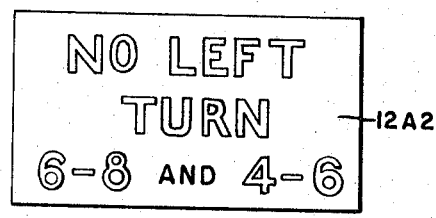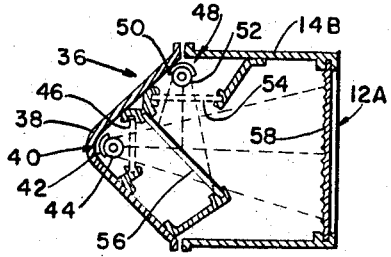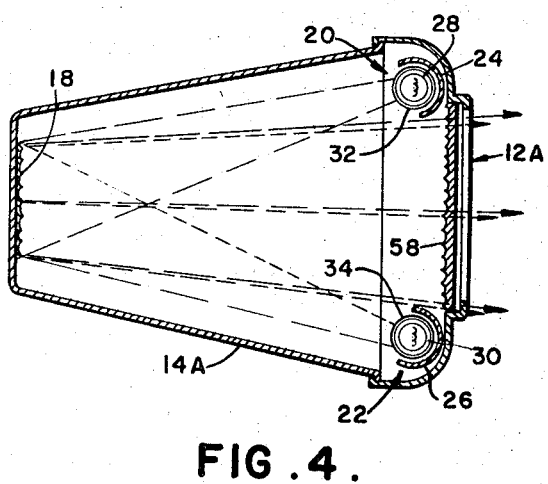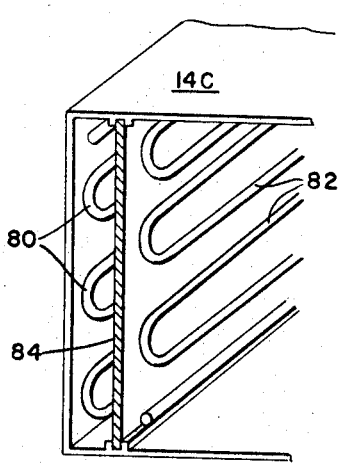

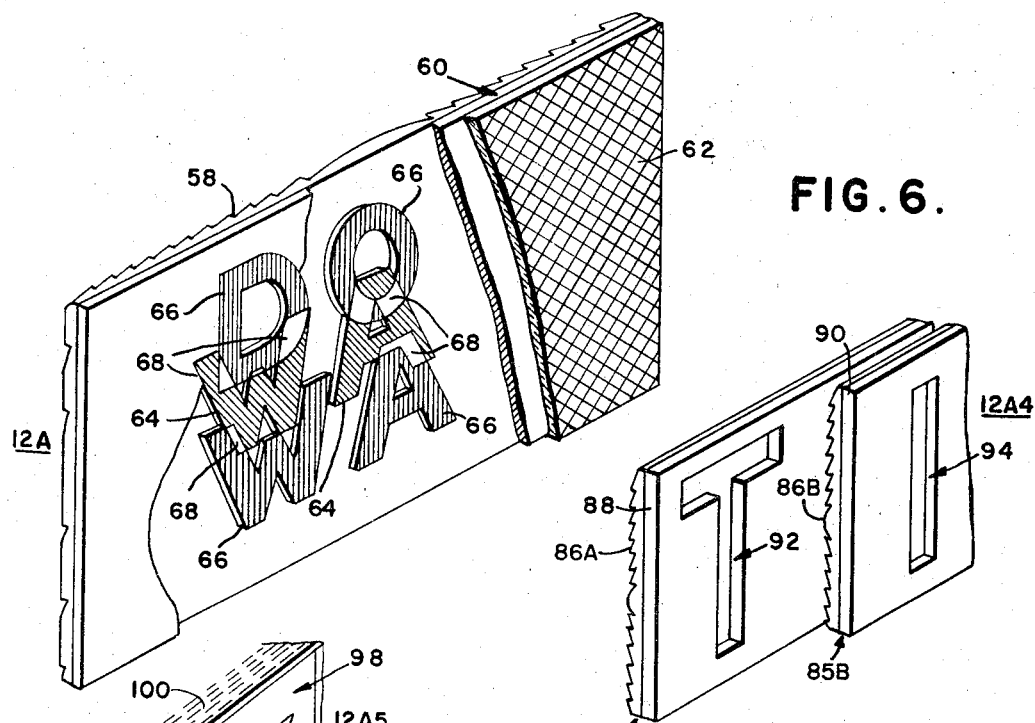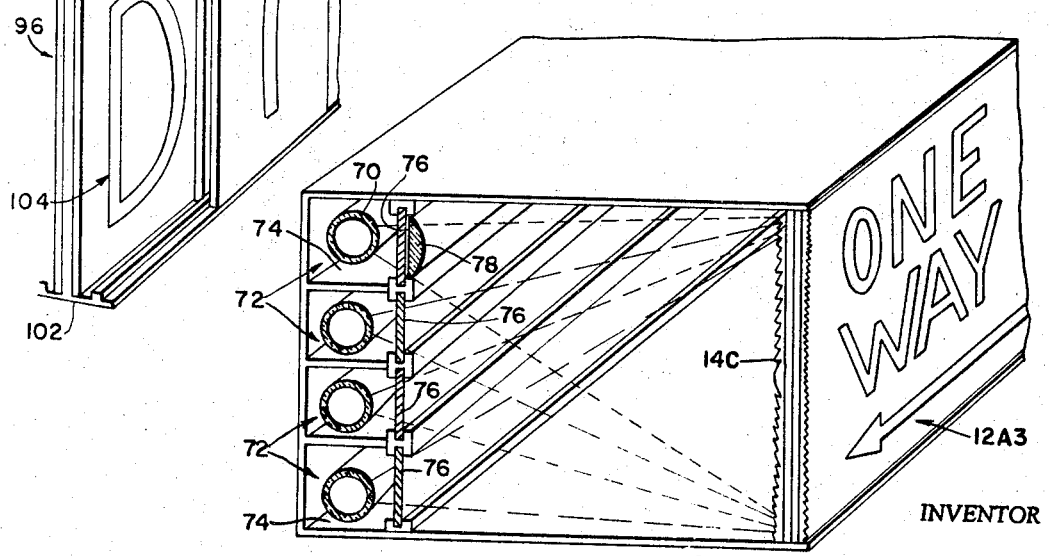

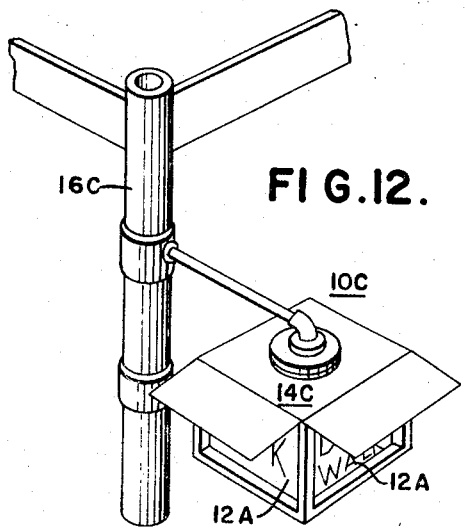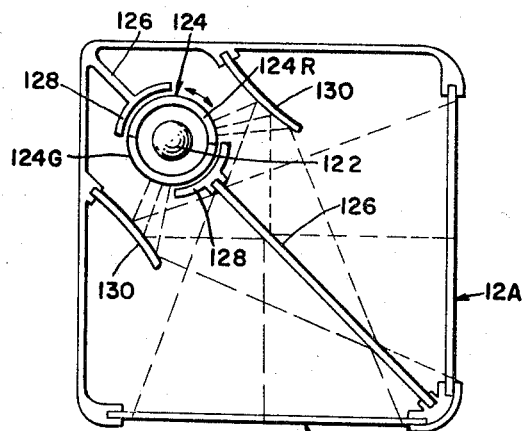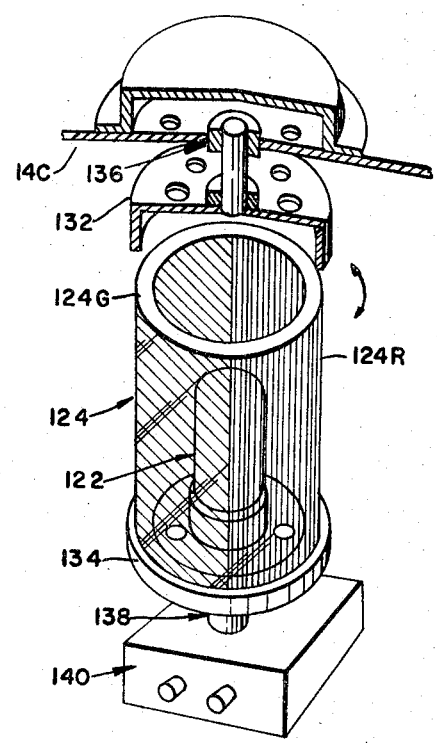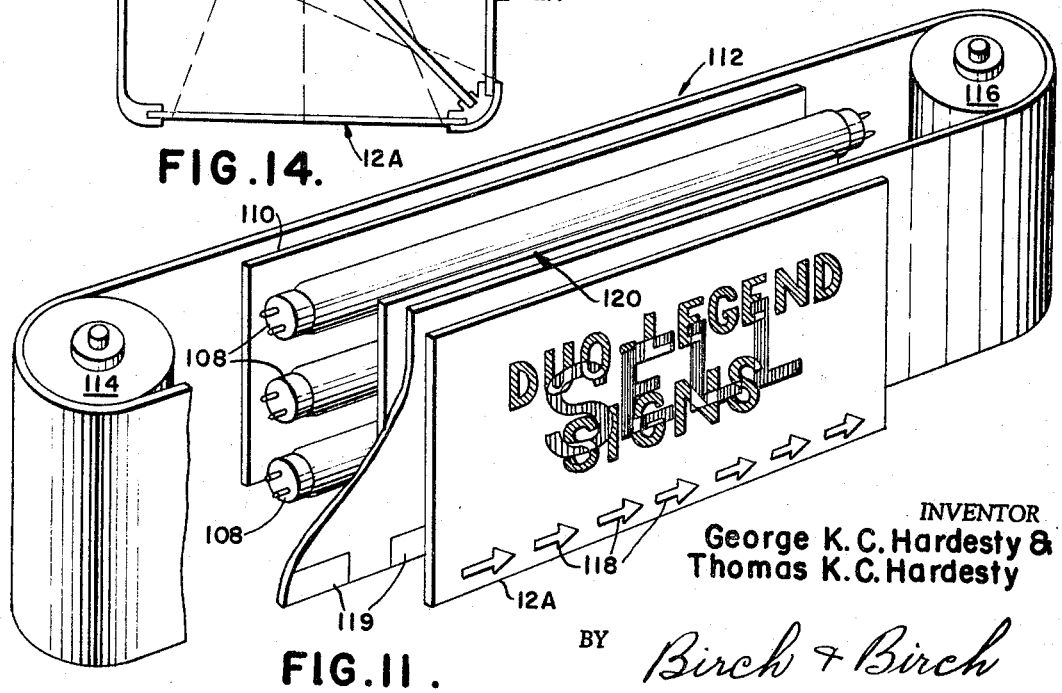

3,423,865
MULTIPLE IMAGE AND LEGEND DISPLAY MEANS
George K. C. Hardesty, Box 156, Mayo, Md. 21106, and Thomas K. C. Hardesty, 1304 Milgrove Place, Silver Spring, Md. 20904
Filed Oct. 22, 1965, Ser. No. 502,134
U.S. Cl. 40—130
Int. Cl. G06f 13/14
17 Claims

ABSTRACT OF THE DISCLOSURE

A changeable exhibitor for displaying multiple images of high intrinsic brightness on a common area of an opaque background is provided. The opaque viewing area is comprised of a multi-layered screen having sets of optical apertures in the respective layers representing different alpha-numeric legends and the like, the respective layers having respectively different optical transmittance characteristics and the sets of optical apertures being substantially out of alignment and having neutral wide-band spectral transmittance characteristics in areas where they overlap. The screen is mounted in an opaque housing containing a light source of high intrinsic brightness with selectively variable optical transmittance filters between the source and the screen. Alternatively, separate light sources of selectively different transmittance characteristics are used. The interaction of the transmittance characteristics transmitted from the source with the multiple transmittance characteristics of the screen provides selective display of the alpha-numeric legends and the like.

---

This invention relates to image display devices and more particularly to such devices wherein multiple superimposed images such as legends and the like may be displayed on the same viewing field.

It is an object of this invention to provide new and novel image display means wherein two or more images such as legends may be superimposed and selectively displayed on a common viewing field.

Another object of this invention is to provide new and novel image display means wherein two or more images such as legends and the like may be superimposed and selectively illuminated to effect brilliant and unambiguous presentation of alternating images or legends on a common viewing field.

Another object of this invention is to provide new and novel image display means wherein two or more images such as legends and the like may be superimposed and selectively illuminated to effect brilliant and unambiguous presentation of alternating images or legends on a common viewing field, said display means having great utility and extreme practicality even for daylight use wherein high beam candlepower and wide viewing angle is essential.

Still another object of this invention is to provide a new and novel multiple image or legend display means including new and novel selective illumination means therein.

Yet another object of this invention is to provide new and novel multiple image or legend display means including new and novel optically coordinated image or legend presenting screen structures.

This and other objects of this invention will become more fully apparent with reference to the following specification and drawings which relate to several preferred embodiments of this invention.

In the drawings:

FIGURE 1 is a perspective of a first embodiment of this invention;

FIGURES 2, 3a and 3b are legend panels of the present invention illustrating various forms of legends which may be displayed;

FIGURE 4 is a cross-sectional schematic of a preferred form of the embodiment of FIGURE 1;

FIGURE 5 is a cross-sectional schematic of another preferred form of the embodiment of FIGURE 1;

FIGURE 6 is a detailed perspective partially broken away of a multiple legend panel of the present invention;

FIGURE 7 is a perspective in cross-section of another preferred embodiment of the invention;

FIGURE 8 is a detailed partial cross-section of another preferred form of light source for the embodiment of FIGURE 7;

FIGURES 9 and 10 are additional embodiments of legend panel structures of the present invention;

FIGURE 11 is a schematic perspective of a mechanically driven legend selector embodiment of the present invention;

FIGURE 12 is a schematic of a multi-directional viewing embodiment of the present invention;

FIGURE 13 is a detailed perspective of a component of the embodiment of FIGURE 12; and FIGURE 14 is a top plan perspective of the internal components of the embodiment of FIGURE 12.

The preferred embodiments of this invention will be specifically related to multiple legend traffic signals or the like in the following specification, although it is to be understood that the basic teachings herein are readily adaptable to other display devices.

The present invention makes possible for the first time the use of each legend display panel of a vehicular or pedestrian traffic control signal for the display of more than one legend. For example, in the case of dual signal requirements such as "WALK, DONT WALK"; "LANE-OPEN, LANE-CLOSED"; "STOP, GO"; graphic symbols such as alternate directional arrows; etc,; such a dual capability obviates the need for two separately housed and lighted signal legends in order to properly present each such legend in the requisite brilliant and clear presentation for such signals.

The present invention provides a compact and highly efficient display means capable of creating spectacular, novel and aesthetic effects having the extremely desirable salient features of utility and extreme practicality for daylight use, the latter requiring high beam candlepower over a controlled viewing angle.

This invention is the result of extensive experimentation and development undertaken to break the bounds of the relatively restricted concepts and teachings of U.S. Patent 2,945,313 issued July 19, 1960, to George K. C. Hardesty, the said patent being directed primarily to diffuse, low-luminance, control and display panels and control console or panel signal hardware. At the time of the former invention it had not been demonstrated that the high beam candlepower, spectacular, daylight display capabilities of the present invention were even possible.

Referring in detail to the drawings and more particularly to FIGURE 1, there is generally shown a stanchion-mounted "walk-dont walk" pedestrian traffic control signal 10 having a legend display panel 12 in one wall of a housing 14, the said housing 14 being mounted on a stanchion 16. As shown, the legend "DONT WALK" is displayed on the panel 12 and will conventionally be comprised of red letters.

In FIGURE 2, there is shown a spectrally selective dual-legend panel 12A including intermingled, optically selectable and separable legends of "WALK" and "DONT WALK," the spectrally selective apertures thereof (to be hereinafter more fully described), being physically intermingled to the end that the display panel 12A has double graphic usage, virtually serving as two separate legend display panels but possessing unique economical and functional advantages over any structures heretofore known.

FIGURES 3(a) and 3(b), respectively, display first and second schematically illustrated legend panel components 12A1 and 12A2 in green and red, respectively, applicable, as well as hereinafter more fully described, to be embodied in the traffic signal 10 of FIGURE 1 as the dual legends in the panel 12A of FIGURE 2.

Referring now to FIGURE 4, a first embodiment of the invention is shown as including an elongated closed housing 14A, generally trapezoidal in cross-section, the said housing 14A, having a dual legend panel 12A (such as shown in FIGURE 2 and hereinafter to be more fully described) substantially comprising one end thereof and having an internal prismatic reflector 18 at the opposite end thereof.

First and second internal colored light assemblies 20 and 22, respectively, are provided on opposite sides of the legend panel 12A and are focused, respectively, by means of first and second cylindrical reflectors 24 and 26 on the prismatic reflector 18. First and second lamp means 28 and 30 are respectively mounted within the first and second reflectors 24 and 26, the said lamps preferably being of the high intrinsic brightness, vertical tungsten filament, clear glass envelope type. Suitable sockets and electrical power supply means, not shown, are provided for the said lamps 28 and 30.

The first and second lamps 28 and 30 are respectively housed within green and red optical filter cylinders 32 and 34 comprised of heat resistant filter glass. In the embodiment specifically illustrated in FIGURE 4, the first and second semicylindrical reflectors 24 and 26 are respectively shown as being mounted on the outside of the first and second optical filter cylinders 32 and 34 for the sake of clarity of illustration but are preferably mounted inside the said filter cylinders so that the light reflected from the said reflectors will only pass through the said filters once.

Referring now to FIGURE 5, an alternate embodiment of a dual-legend traffic signal or the like is shown as including a pentagonal cross-section of housing 14B having the dual-legend panel 12A (FIGURE 2) as the end wall in the rectangular cross-sectional portion thereof, the opposite end wall 36 comprising a substantially right-angular, symmetrical V-shaped, cross-sectional configuration intersecting the sidewalls of the rectangular portion at substantially a forty-five degree (45°) angle.

In the apex 38 of the V-shaped end wall 36 is mounted a first light source 40 comprising a first sectioned cylindrical reflector 42, a first high intrinsic brightness lamp 44 of the type described in the embodiment of FIGURE 4, and a green first filter glass wall 46 confining the said lamp and reflector in the said apex and located between the said lamp 44 and the inner face of the legend panel 12A.

A second light source 46, mounted within the housing 14B within the angle subtended by the V-shaped end wall 36 and (as illustrated) the top wall of the housing 14B, comprises a sectioned cylindrical reflector 50, a second high intrinsic brightness lamp 52 and a red second filter glass wall 54 confining the said reflector and lamp 50 and 52.

A di-chroic, forty-five degree (45°) beam splitter 56 is so disposed with respect to the green and red filter glass walls as to selectively transmit the green light emitted from the first light source 40 to the interior face of he legend panel 12A and to intercept and by selective reflection direct the red light emitted from the second light source 48 onto the interior face of the said legend panel 12A. This beam splitter is much more effective than partially silvered mirror types which would attenuate both the red and green light.

Referring jointly to FIGURES 2 and 6, the structure of the dual-legend panel 12A will now be described in detail, the "WALK" legend being conventionally adapted to be displayed in the color green and the "DONT WALK" legend being adapted to be conventionally displayed in the color red; both said legends being exhibited with high beam candlepower.

The interior or rear face of the legend panel 12A comprises a Fresnel lens 58 co-extensive with the said legend panel 12A and bonded to one side of an opaque, mutually coextensive, inner laminate 60. An embossed prismatic high transmittance laminate 62, mutually coextensive with the Fresnel lens 58 and opaque inner laminate 60, is bonded to the other side of the said inner laminate 60 and comprises the obverse surface of the legend panel 12A and functions, as will be hereinafter more fully described, as an external field spreading lens for the said legend panel 12A.

The legend "WALK" is comprised substantially of light pervious green filter material in the form of letters 64 inlayed in the opaque inner laminate 60 such that a green selective optical aperture spelling out "WALK" is provided through the said inner laminate 60.

The legend "DONT WALK" is comprised substantially of light pervious red filter material in the form of letters 66 inlayed in the opaque inner laminate 60 such that a red selective optical aperture spelling out "DONT WALK" is provided through the said inner laminate 60.

Since the two legends are inlayed in the same laminate of the legend display panel 12A, there are mutual areas 68 in which the color selective apertures of the letters 64 and 66 coincide. These areas 68 are formed of either a clear transparent material or a neutral gray light transmitting material for a purpose to be hereinafter more fully described.

Additional embodiments of this invention characterized by fixed alternately energized multiple internal light sources are illustrated in FIGURES 7 and 8.

Referring now to FIGURE 7, there is illustrated a traffic signal comprising a housing 14C having a multiple legend transmittance panel 12A3, structurally identical with panel 12A of FIGURE 6, at one end thereof and a bank of individually compartmented fluorescent lamp light sources 70, substantially in mutually parallel geometric relationship, the compartments 72 holding the sources 70 being bounded of light opaque webs 74 or the like on all but the interior faces thereof. The interior faces of the source compartments 72 comprise high transmittance color filter means 76, alternate ones of said compartments 72 having, for example, red and green color filters 76, respectively.

The color filter means 76 may be overlaid with short focal length cylindrical lenses 78 if desired, to augment the intensity of the illumination impinging on the Fresnel lens 58 on the inner face of the transmittance panel 12A3 by modifying the initial beam distribution from the fluorescent lamp sources 70.

Referring now to FIGURE 8, an alternate form of fixed light source is shown as comprising first and second colored neon tube type light emitting means 80 and 82, such means actually containing various types of ionizable gases which may or may not be neon.

The first light emitting means 80 is green in color in the specific red and green signal embodiments used as examples herein, is the outermost emitting means and is separated from the red second emitting means 82 by a green color filter means 84, the latter serving to properly constrain the green emission of the first emitting means 80 to the proper spectral bandwidth.

The second light emitting means 82 is red in color in this specific example and is adapted to directly illuminate the internal surface (Fresnel lens 58) of the panel 12A3 when the light source of FIGURE 8 is utilized in the embodiment of FIGURE 7 in place of the fluorescent lamp sources 70.

Additional embodiments of the multiple or dual legend panel means such as 12A of FIGURES 2 and 6 and 12A3 of FIGURE 7, are shown in FIGURES 9 and 10.

Both of these embodiments are characterized by the incorporation of removable, superimposed, red and green light transmitting fields with respective color selecting light transmitting apertures therein as will now be more fully described.

Referring next to FIGURE 9, there is shown a multiple legend panel means 12A4 comprising, in this specific example, first and second single legend panels 85A and 85B, respectively. The said first and second panels 80 and 82 comprise, respectively, first and second Fresnel lens laminations 86A and 86B bonded, respectively, to red and green color field laminations 88 and 90, the said color field laminations having first and second alpha-numeric symbols 92 and 94 or the like cut or stamped therein, thus providing clear optical apertures through each of the said color fields.

Thus, by selective illumination of the red and green light sources disclosed in the above-described embodiments, should such embodiments be provided with a multiple legend panel 12A4, selective red and green light transmittance through the alpha-numeric apertures 92 and 94 may readily be effected.

The use of the two Fresnel lenses 86A and 86B in the legend panel 12A4 is advantageous in that the focal length of the two superimposed lenses is approximately one-half (½) that of a single Fresnel lens and thus provides a means by which the light sources may be closer to the legend panels 12A and the housings for such light sources may be more compact than in the single Fresnel lens embodiments.

Referring next to FIGURE 10, there is shown the alpha-numeric obverse portion of a multiple legend panel 12A5, comprising first and second alpha-numeric panel modules 96 and 98 slidably mounted in upper and lower track or guide members 100 and 102, such that both the said modules 96 and 98 are interchangeably superimposed. As a specific example, each of the first modules 96 may be mounted in the rearmost position of the track members 100 and 102 with respect to the obverse surface of the legend panel 12A5 and comprise a red color field having transparent colorless alpha-numeric apertures 104 therein. Each of the second modules 98 may correspondingly be mounted in the foremost position of the track members 100 and 102 with respect to the obverse surface of the legend panel 12A5 and comprise a green color field having transparent colorless alpha-numeric apertures 106 therein.

Thus there is provided a means by which the letters and numerals of a legend may be interchanged, each complete set of red field modules 96 providing a first font of alpha-numeric symbols or the like and each complete set of green field modules 98 providing a second font of alpha-numeric symbols or the like.

As will hereinafter become more readily apparent, the red field modules 96 will transmit green light through the optical apertures 104 therein and the green field modules 98 will transmit red light through the optical apertures 106 therein.

Referring now to FIGURE 11, another embodiment of changeable exhibitor type display means is shown schematically as including a dual-legend panel 12A, such as shown in FIGURE 6, a light source comprising a bank of fluorescent lamps 108, a reflector panel 110 behind the lamps 108 and an endless belt 112 passing between the lamps 108 and legend panel 12A on the front side of the reflector 110 and also passing behind the said reflector 110. The belt 112 is reeved around two rotary drums 114 and 116, one of which may be suitably driven, and comprises several color filter areas along its extent such that translation thereof between the source lamps 108 and the inner face of the legend panel 12A provides several ranges of spectral transmittance through the legend panel 12A.

The panel 12A may include other display symbols such as the arrows 118, and the color belt 112 may be provided with alternate clear and opaque or other colored areas 119 in registry with the said symbols 118 to provide special on-off or color changing effects thereon.

If desired for compactness, an additional Fresnel lens panel 120 may be placed between the source lamps 108 and the color belt 112 to shorten the focal length required for the integral Fresnel lens 58 of the legend panel 12A (FIGURE 6).

Another embodiment of this invention provides changeable traffic signs and the like which are to be viewed from several directions, such as for example, the orthogonally related directions of a conventional street intersection, and reference is now made to FIGURES 12, 13 and 14.

In FIGURE 12, there is shown a two-directional "WALK—DONT WALK" pedestrian signal 10C comprising a housing 14C having an adjacent pair of its four vertical sides respectively comprised of dual-legend panels 12A previously described in connection with FIGURE 6. The housing 14C is shown as being mounted on a stanchion 16C, which in this specific instance is the post portion of a conventional corner street sign.

As illustrated in FIGURES 13 and 14, a single light source comprising a lamp 122 enclosed in a rotatable filter cylinder 124, the latter comprising two half-cylinders 124R and 124G of red and green optical filter material, respectively, is mounted adjacent one inside corner of the housing 14C along a diagonal thereof, the said one corner being diagonally opposite the corner common to the two adjacent legend panels 12A.

A diagonally disposed reflector means 126 partitions the interior of the housing 14C and is juxtaposed with the filter cylinder 124 by means of arcuate light seal assemblies 128. Additional planar reflector means 130 of curvilinear plan are positioned symmetrically on opposite sides of the filter cylinder 124 to effect a maximized reflection of light from the lamp 122 onto the diagonal reflector 126 and thence out through the panels 12A.

The filter cylinder 124 and lamp 122 are mounted between upper and lower circular plates 132 and 134, respectively, the said upper plate 132 including journal bearing means 136 engaged in the top wall of the housing 14C and the said lower plate 134 being mounted for rotation with the output shaft 138 of a motor or rotary solenoid 140.

The motor 140 is adapted in any suitable conventional manner to be indexed through 180° of output shaft rotation upon each energization thereof, whereby the filter cylinder 124 may be rotated on the output shaft 138 to alternately present the red and green filter portions 124R and 124G, respectively, to opposite sides of the lamp 122 and effect red or green light transmittance to opposite sides of the diagonal reflector 126.

In all of the foregoing embodiments, the principle of operation is to alternately impinge red or green light beams on the inner (Fresnel lens) side of the legend panels, such as the panels 12A, such that red and green light responsive portions of the legend in the said legend panels will accordingly be illuminated.

Any suitable selective switching means may be utilized to effect this operation in the embodiments of FIGURES 1, 4, 5, 7 and 8 or mechanical shifting of the filter media may be utilized such as disclosed herein with reference to the embodiments of FIGURES 11, 12, 13 and 14.

In summary, in all of the foregoing embodiments, the alternate energization of the red and green light source means therein effects a selective virtual opening and virtual closing of the spectrally selective alpha-numeric or other apertures in the multiple legend panel structures thereof. More than two legends and more than two colors of light source may be incorporated in other closely related embodiments.

This invention provides a long felt need in the art for a compact, vivid, legend or image display means wherein a multiplicity of legends in superimposed relationship may be commonly backlighted and yet selectively displayed with full clarity and high intrinsic brightness, one to the complete exclusion of the other(s).

It is to be understood that the several embodiments shown and described herein are for the purpose of example and are not intended to limit the scope of the appended claims. In particular, the preferred order of colored laminates Fresnel lens (if used) and the indicia aperture-defining means may vary greatly with modes of manufacture.

What is claimed is:

1. An image display means for the selective display of superimposed images in a common viewing area comprising a light opaque housing; illumination means in said housing having a plurality of selectively transmittable emanations of predetermined spectral characteristics; and multiple image display screen means mounted in said housing as a wall portion thereof, said display screen means comprising Fresnel lens means coextensive with said display screen means, light opaque layer means coextensive with said Fresnel lens means, and a plurality of images to be displayed comprising, respectively, optical aperture means defined in said opaque layer means and having selective spectral transmittance characteristics, corresponding, respectively, to said predetermined spectral characteristics of said illumination means, and wherein common overlapping areas of said optical apertures have neutral, wide-band spectral transmittance characteristics.

2. The invention defined in claim 1, wherein said predetermined spectral characteristics of said emanations of said illumination means comprise red and green light emanations; and wherein said display screen means includes first and second images defined respectively, by first and second optical aperture means having, respectively, selective red and green light transmittance characteristics, whereby upon the selective occurrence of red and green light emanations from said illumination means said first and second images, respectively, are selectively displayed, one to the exclusion of the other.

3. The invention defined in claim 1, wherein said display screen means includes light scattering layer means over the obverse surface thereof.

4. The invention defined in claim 1, wherein said illumination means comprises light source means characterized by high intrinsic brightness and a plurality of optical filter means respectively having a plurality of predetermined spectral transmittance characteristics selectively interposed between said light source means and said display screen means effecting said plurality of emanations having respectively predetermined spectral characteristics from said illumination means onto the inner surface of said display screen means.

5. The invention defined in claim 1, wherein said illumination means comprises first and second light source means characterized by high intrinsic brightness, each said source means being mounted in said housing adjacent said display screen means, first and second optical filter means of selected spectral transmittance characteristics, respectively, enclosing said first and second light source means, first and second focused reflector means at said first and second light source means, respectively, reflecting light from said source means through said filter means and away from said display screen means into said housing, and third focused reflector means in said housing intercepting the light reflected from said first and second reflector means and reflecting same onto the inner surface of said display screen means.

6. The invention defined in claim 1, wherein said illumination means comprises first and second light source means characterized by high intrinsic brightness, each said source means being mounted in said housing substantially opposite the inner surface of said display screen means, first and second optical filter means of selected spectral transmittance characteristics, respectively, enclosing said first and second light source means, first and second focused reflector means at said first and second light source means, respectively, reflecting the light from said source means onto a common area, dichroic beam splitter means coextensive with said common area reflecting and directly transmitting, respectively, the light from said first and second source means onto the inner surface of said display screen means.

7. The invention defined in claim 1, wherein said illumination means comprises a plurality of light source means characterized by high intrinsic brightness mounted in said housing and emanating light directly onto the inner surface of said display screen means and spectrally selective optical filter means of predetermined respective spectral transmittance characteristics interposed between selected ones of said light source means and the inner surface of said display screen means.

8. The invention defined in claim 7, wherein said light source means comprise first and second ionized gas tube banks mounted in said housing substantially opposite the inner surface of said display screen means.

9. The invention defined in claim 7, wherein said light source means comprise a like plurality of fluorescent lamps mounted in a bank substantially opposite the inner surface of said display screen means.

10. The invention defined in claim 7, wherein said light source means comprises a like plurality of fluorescent lamps mounted in a bank substantially opposite the inner surface of said display screen means; and wherein said optical filter means comprises an endless driven belt disposed around said light source means having a selected plurality of adjacent areas thereon of predetermined spectral transmittance characteristics.

11. The invention defined in claim 1, wherein said illumination means comprises light source means mounted in said housing, optical filter means surrounding said light source means and including a plurality of areas therein having predetermined spectral transmittance characteristics, reflector means in said housing directing light emanated from said source means, through said filter means, onto the inner surface of said display screen means, and indexing means drivably connected with said filter means effecting a selective repositioning of said areas in said filter means relative to said light source means and said display screen means.

12. Image display means for the selective display of superimposed images in a common viewing area comprising a light opaque housing; illumination means in said housing having a plurality of selectively transmittable emanations of predetermined spectral characteristics; and multiple image display screen means mounted in said housing as a wall portion thereof, said display screen means comprising Fresnel lens means coextensive with said display screen means, light opaque layer means comprising a plurality of superimposed optical filter layers coextensive with said Fresnel lens means, and a plurality of images to be displayed comprising a respective plurality of optical aperture means defined in selected ones of said plurality of filter layers, said optical apertures being out of alignment with each other and having neutral, wide-band spectral transmittance characteristics.

13. The invention defined in claim 12, wherein said Fresnel lens means comprises a plurality of Fresnel lenses respectively coextensive and immediately adjacent with said plurality of optical filter layers.

14. The invention defined in claim 12, wherein each said filter layer means of a given transmittance characteristic comprise a plurality of modular sections removably mounted one with respect to the other providing a selectively variable size color field.

15. The invention defined in claim 13, wherein each said filter layer means of a given transmittance characteristic comprise a plurality of modular sections removably mounted one with respect to the other providing a selectively variable size color field.

16. Image display means for the selective display of superimposed images in a common viewing area comprising a light opaque housing; illumination means in said housing having a plurality of selectively transmittable emanations of predetermined spectral characteristics; multiple image display screen means mounted in said housing as a wall portion thereof, said display screen means comprising light opaque layer means comprised of a plurality of superimposed optical filter layers and a plurality of images to be displayed comprised of a respective plurality of optical aperture means defined in selected ones of said plurality of filter layers, said optical apertures being out of alignment with each other and having neutral, wide-band spectral transmittance characteristics; and collimating means intermediate said illumination means and said display screen means.

17. Image display means for the selective display of superimposed images in a common viewing area comprising a light opaque housing; illumination means in said housing having a plurality of selectively transmittable emanations of predetermined spectral characteristics; multiple image display screen means mounted in said housing as a wall portion thereof, said display screen means comprising light opaque layer means and a plurality of images to be displayed comprising, respectively, optical aperture means defined in said opaque layer means and having selective spectral transmittance characteristics, corresponding, respectively, to said predetermined spectral characteristics of said illumination means, and wherein common overlapping areas of said optical aperture means have neutral, wide-band spectral transmittance characteristics; and collimating means intermediate said illumination means and said display screen means.

References Cited

UNITED STATES PATENTS

| | | | |
|---|---|---|---|
| 2,863,240 | 12/1958 | Glukes | 40—132 |
| 1,218,082 | 3/1917 | Hall. | |
| 1,421,509 | 7/1922 | Lockwood. | |
| 1,777,866 | 10/1930 | Steiss | 40—132 |
| 1,857,882 | 5/1932 | Shipman | 40—132 |
| 2,560,392 | 7/1951 | Latrobe | 40—106.52 |
| 2,590,240 | 3/1952 | Epstein | 88—24 X |
| 2,793,356 | 5/1957 | Hart | 40—132 X |
| 3,126,786 | 3/1964 | Appeldorn. | |
| 3,176,578 | 4/1965 | Bolsey. | |

EUGENE R. CAPOZIO, *Primary Examiner.*

RICHARD CARTER, *Assistant Examiner.*

U.S. Cl. X.R.

40—106.52